(12) United States Patent
Bray et al.

(10) Patent No.: US 7,190,799 B2
(45) Date of Patent: Mar. 13, 2007

(54) AUDIO ROUTING FOR AN AUTOMOBILE

(75) Inventors: Thomas J. Bray, Saline, MI (US);
Paul Allen Berneis, Dexter, MI (US);
Borys Joseph Melnyk, Allen Park, MI (US); Jeff Matson, White Lake, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 702 days.

(21) Appl. No.: 10/273,490

(22) Filed: Oct. 18, 2002

(65) Prior Publication Data

US 2003/0081796 A1    May 1, 2003

Related U.S. Application Data

(60) Provisional application No. 60/341,095, filed on Oct. 29, 2001.

(51) Int. Cl.
*H04B 1/00*    (2006.01)
(52) U.S. Cl. .................. 381/86; 455/137; 381/119
(58) Field of Classification Search ............... 381/86, 381/110, 77, 80, 81, 119; 455/132, 137, 455/218, 518
See application file for complete search history.

(56) References Cited

U.S. PATENT DOCUMENTS

| | | | |
|---|---|---|---|
| 4,232,390 A | | 11/1980 | McEvilly, Jr. |
| 4,506,377 A | * | 3/1985 | Kishi et al. .................. 704/275 |
| 4,896,370 A | | 1/1990 | Kasparian et al. |
| 4,908,858 A | * | 3/1990 | Ohno ............................. 381/1 |
| 5,255,326 A | * | 10/1993 | Stevenson .................... 381/110 |
| 5,371,802 A | * | 12/1994 | McDonald et al. ......... 381/71.4 |
| 5,574,514 A | | 11/1996 | Tanihira et al. |
| 5,673,327 A | * | 9/1997 | Julstrom ...................... 381/119 |
| 5,910,996 A | | 6/1999 | Eggers et al. |
| 6,052,471 A | | 4/2000 | Van Ryzin |
| 6,141,536 A | * | 10/2000 | Cvetkovic et al. ............. 455/45 |
| 6,154,658 A | * | 11/2000 | Caci ............................ 455/466 |
| 6,188,939 B1 | | 2/2001 | Morgan et al. |
| 6,356,568 B1 | | 3/2002 | Nakatsugawa |
| 6,389,340 B1 | | 5/2002 | Rayner |
| 6,473,509 B2 | * | 10/2002 | Albus et al. ................ 381/71.4 |
| 2002/0021751 A1 | | 2/2002 | Bolcioni et al. |
| 2005/0020223 A1 | * | 1/2005 | Ellis et al. ................ 455/186.1 |

FOREIGN PATENT DOCUMENTS

GB        1 571 750        7/1980

* cited by examiner

*Primary Examiner*—Vivian Chin
*Assistant Examiner*—Jason Kurr
(74) *Attorney, Agent, or Firm*—Brinks Hofer Gilson & Lione

(57) ABSTRACT

An audio signal processing system for a vehicle is disclosed. The vehicle has a plurality of audio output producing devices. The system includes an audio input circuit, a processor, an audio output circuit, and at lease one speaker. The audio input circuit receives a plurality of audio signals from the plurality audio output producing devices. The processor is in communication with the audio input circuit for combining the plurality of audio signals. The audio output circuit is in communication with the audio input circuit for receiving the combined plurality of audio output signals. The audio output circuit conditions the plurality of audio signals for output. The at least one speaker broadcasts the conditioned plurality of audio signals to a vehicle occupant.

10 Claims, 10 Drawing Sheets

AUDIO ROUTING FOR AN AUTOMOBILE

CROSS-REFERENCE TO RELATED APPLICATIONS

The present invention claims priority to U.S. Provisional Ser. No. 60/341,095, filed Oct. 29, 2001, entitled "Audio Routing For An Automobile."

TECHNICAL FIELD

The present invention relates to systems and methods for routing audio signals in an automobile and for allowing multiple audio signals to be broadcasted over a single set of speakers.

BACKGROUND

A typical emergency services vehicle today has numerous devices that use audio inputs and generate audio outputs. They include two-way radios, scanners, AM/FM radios, PA systems, Doppler radar tones, computer input and output, etc. In most cases each piece of equipment that generates output will have its own speakers and each piece of equipment that requires input will have its own microphone.

The proliferation of speakers and microphones (and often the equipment to which they are attached) in the passenger compartment leads to clutter and confusion. The audio outputs are not coordinated with each other, so a low priority output might drown out a high priority output. Similarly, it may be difficult to locate the correct microphone for a particular device.

One of the reasons that vehicles may have multiple two-way radios is that different emergency services may communicate on different bands, thus requiring a separate radio for each service. A consequence of this is that when several emergency services arrive at a site, they may not all be able to talk to each other. The situation is exacerbated when the workers leave their vehicles and carry handheld radios, which typically service a single band each.

Large agencies have command vehicles that contain specialized equipment (repeaters) to receive signals on one band and retransmit them on another. These vehicles are deployed to sites as needed, to allow the different services to communicate with each other.

Therefore, what is needed is a system and method for an automobile that integrates all of the audio signaling, and eliminates redundant speakers and microphones. The system and method should also allow any vehicle to become a repeater using two-way radios already present.

SUMMARY

In an aspect of the present invention an audio signal processing system for a vehicle is provided. The vehicle has a plurality of audio output producing devices. The system includes an audio input circuit, a processor, an audio output circuit, and at lease one speaker. The audio input circuit receives a plurality of audio signals from the plurality audio output producing devices. The processor is in communication with the audio input circuit for combining the plurality of audio signals. The audio output circuit is in communication with the audio input circuit for receiving the combined plurality of audio output signals. The audio output circuit conditions the plurality of audio signals for output. The at least one speaker broadcasts the conditioned plurality of audio signals to a vehicle occupant.

In another aspect of the present invention the audio input circuit further comprises a plurality of analog to digital converters.

In yet another aspect of the present invention the audio input circuit further comprises a plurality of CODECS.

In yet another aspect of the present invention the audio input circuit comprises twenty CODECS.

In still another aspect of the present invention the processor further comprises a digital signal processor.

In still another aspect of the present invention the system further comprises four speakers.

In still another aspect of the present invention the system further comprises at least one microphone.

In yet another aspect of the present invention the audio output circuit further comprises an audio amplifier.

In yet another aspect of the present invention the audio input circuit further comprises a microphone router circuit for directing a plurality of microphone inputs to a plurality of audio equipment.

In still another aspect of the present invention the audio output circuit further comprises an audio mixer for receiving the plurality of audio signals and directing the plurality of audio signals to the proper output device. In yet another embodiment of the present invention, the audio mixer functions is a repeater by receiving audio signals having different frequencies and outputting an audio output signal having a single frequency.

In yet another aspect of the present invention an audio signal processing system for a vehicle is provided. The vehicle has a plurality of audio output producing devices. The system includes an audio input circuit, a processor, a voice activated control circuit, an audio output circuit, and at lease one speaker. The audio input circuit receives a plurality of audio signals from the plurality audio output producing devices. The processor is in communication with the audio input circuit for combining the plurality of audio signals. The voice activated control circuit in communication with the processor for controlling a processor operation. The audio output circuit is in communication with the audio input circuit for receiving the combined plurality of audio output signals. The audio output circuit conditions the plurality of audio signals for output. The at least one speaker broadcasts the conditioned plurality of audio signals to a vehicle occupant.

In yet another aspect of the present invention a method for processing audio signals for broadcasting in a vehicle is provided. The vehicle has a plurality of audio output producing devices. The method includes receiving a plurality of audio signals from the plurality of audio output producing devices, combining the plurality of audio signals using a processor, receiving the combined plurality of audio output signals using an audio output circuit, wherein the audio output circuit conditions the signals for output, and broadcasting the conditioned plurality of audio signals to a vehicle occupant using at lease one speaker.

These and other aspects and advantages of the present invention will become apparent upon reading the following detailed description of the invention in combination with the accompanying drawings.

DETAILED DESCRIPTION

Figure 1:
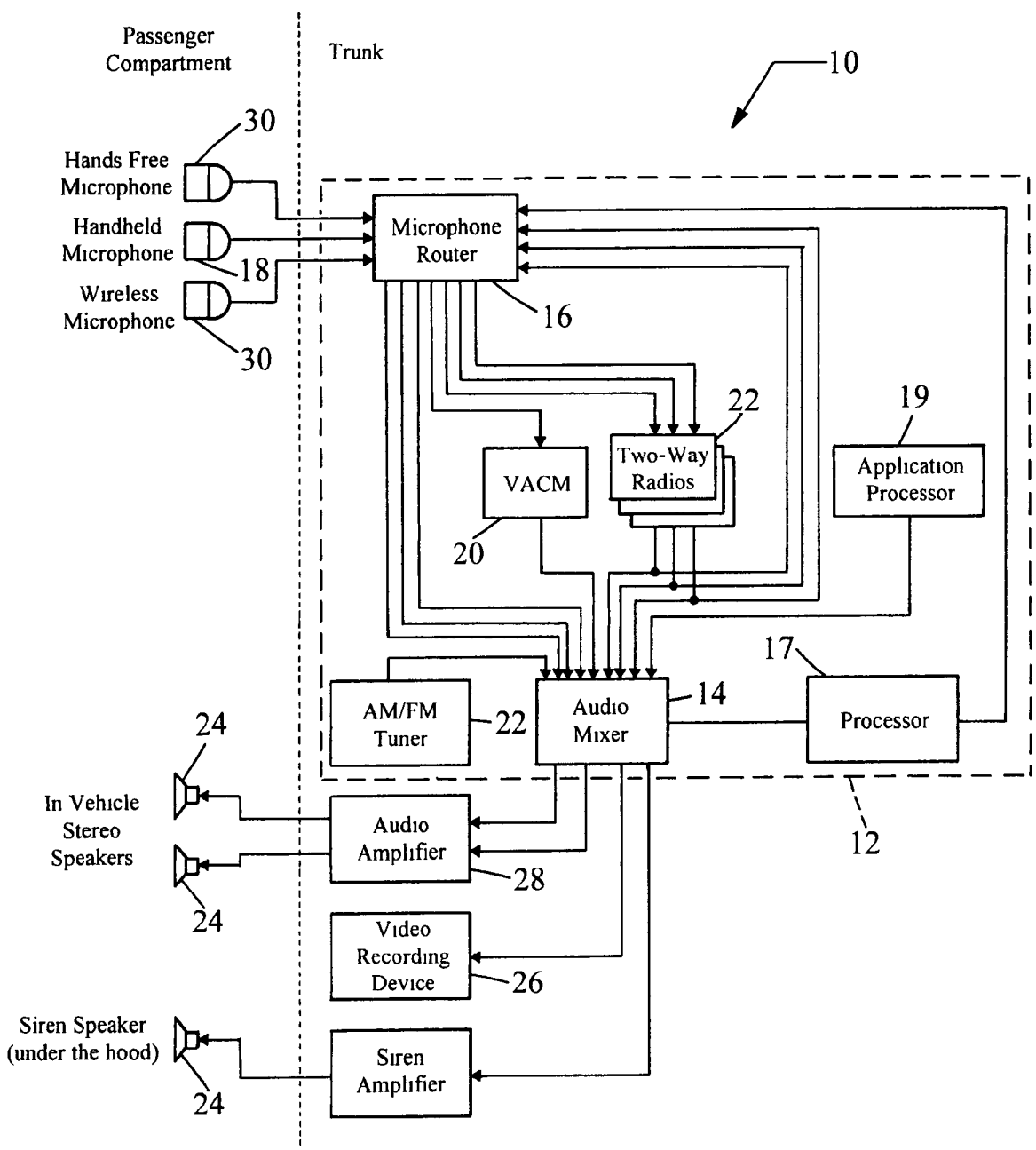
FIG. 1 is a schematic diagram illustrating a vehicle having an audio board for mixing and broadcasting audio signals, in accordance with the present invention.

With reference to FIG. 1, a vehicle 10 having an audio board 12 for mixing and broadcasting audio signals is provided, in accordance with the present invention. The audio board 12 includes an audio mixer 14 for combining audio signals for delivery to the user and other equipment, and a microphone router for directing the microphone inputs to the equipment that uses them.

Microphone router 16 and audio mixer 14 are barn under the control of a processor 17 such as a MPC-565. The microphone router directs microphone input from either an array microphone or the hand-held microphone to the appropriate piece of equipment (e.g., a radio transmitter or the voice recognition system (VACM) 20). The audio mixer 14 takes all of the available audio signals (radios 22, microphones, voice feedback, etc.) and directs them to the proper output devices (e.g., speakers 24 in the vehicle or the PA speaker (not shown)). Additionally an application's processor 19 in communication with audio mixer 14 is a source of audio signals and communicates the audio signals to audio mixer 14. AP 19 is a Windows' based computer system for hosting Windows' applications.

Further, the audio mixer 14 receives audio from a variety of devices in the vehicle and routes them to speaker 24, PA, and an optional recording device 26. The audio mixer 14 is, in an embodiment of the present invention, a 15 input×3 output switch. In principle it could route any mix of input signals to any combination of output ports.

The mixer handles three kinds of inputs: monaural microphones with push-to-talk (PTT) signal, other monaural inputs (without PTT), and stereo inputs. The monaural and stereo inputs can be either line level or speaker level signals.

Table 1, below, shows an assignment of the inputs signals of an embodiment of the present invention.

TABLE 1

| Signal | Purpose | Type |
| --- | --- | --- |
| 1 | Output from radio (AM/FM tuner, voice feedback from VACM, etc.) | stereo |
| 2 | AP sound/voice | stereo |
| 3 | general purpose (two-way radio, scanner, etc.) | monaural |
| 4 | general purpose | monaural |
| 5 | general purpose | monaural |
| 6 | general purpose | monaural |
| 7 | general purpose | monaural |
| 8 | general purpose | monaural |
| 9 | general purpose | monaural |
| 10 | general purpose | monaural |
| 11 | general purpose | monaural |
| 12 | general purpose | monaural |
| 13 | microphone 1 | microphone |
| 14 | microphone 2 | microphone |
| 15 | microphone 3 | microphone |

The mixer 14 delivers three outputs: (1) for a stereo speaker amplifier 28, (2) for the PA amplifier, and (3) for an optional recording device 26. Table 2, below, shows an assignment of the output signals, in accordance with an embodiment of the present invention.

TABLE 2

| Signal | Purpose | Type |
| --- | --- | --- |
| 1 | power amplifier to vehicle speakers | stereo |
| 2 | PA system | monaural with PTT |
| 3 | optional recording system | monaural |

Internally mixer 14 in an embodiment of the present invention, has three output busses: (1) a Stereo bus—a left and a right audio channel, (2) Aux (auxiliary) bus—a monaural audio channel, (3) PA (public address) bus—a monaural audio channel and a push-to-talk signal.

There are 15 input lines that connect to the busses, under computer control. The input lines are partitioned into three microphone inputs, ten monaural inputs, and two stereo inputs. Each of the three kinds of inputs connects to the busses differently, and delivers a slightly different set of capabilities.

As shown in FIG. 1, note that the audio outputs of the radios feed back into the microphone router, so that output from one radio can be fed back into another radio, thus accomplishing the repeater function.

Figure 2:
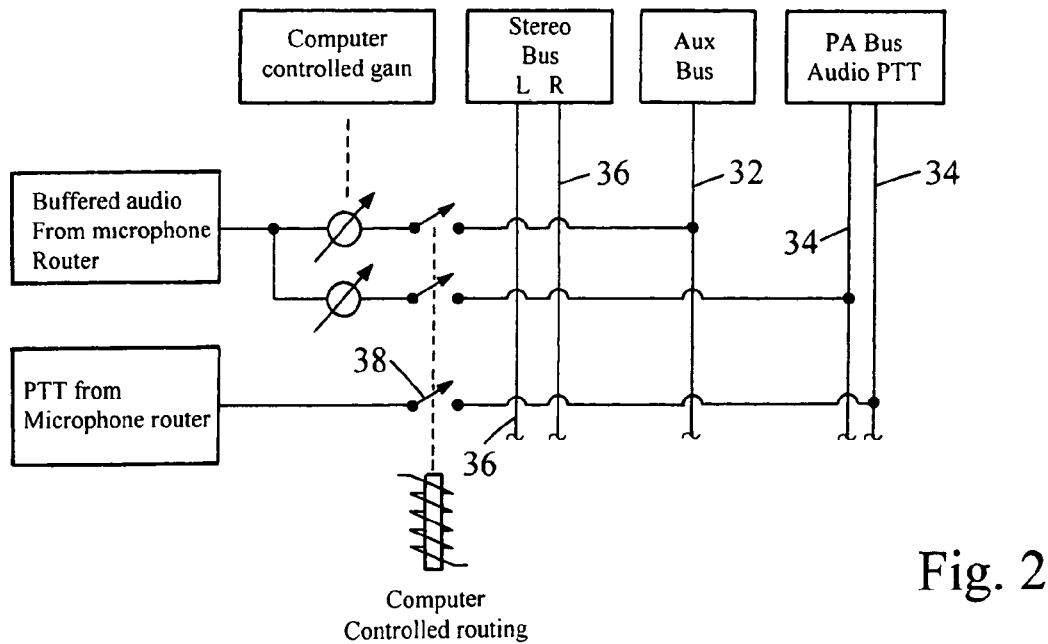
FIG. 2 is a schematic diagram illustrating the connection of a microphone (not shown) to the mixer busses, in accordance with the present invention.

With reference to FIG. 2, the connection of a microphone 18 (shown in FIG. 1) to mixer 14 busses is illustrated, in accordance with the present invention. Microphone 30 can be routed to the Aux 32 and PA 34 busses. The microphone should not be routed to stereo bus 36. Further, the PTT signal routing is shown as a relay 38 in FIG. 2. However, the PTT signal routing could equally well be implemented as a solid-state switch.

Figure 3:
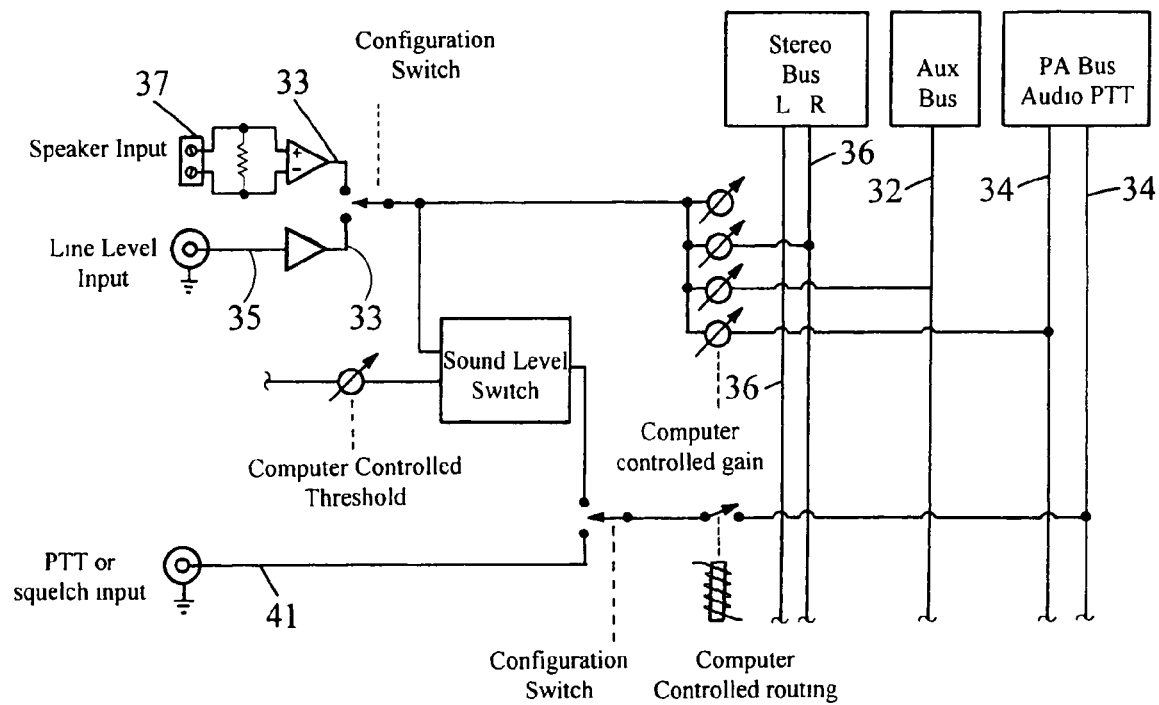
FIG. 3 is a schematic diagram illustrating the connection of a monaural input to the mixer busses, in accordance with the present invention.

With reference to FIG. 3, the connection of a monaural input 33 to the mixer busses is illustrated, in accordance with the present invention. The monaural signal can be routed to all three busses 32, 34 and 36. By changing the relative volume of the signal on the left and right stereo channels, the mixer can pan the signal from left to right.

Each monaural input has two mechanically configured settings. First the input signal can be either line level 35 or speaker level 37. Second, a push-to-talk signal 41 can either be supplied directly by the input device or a computer controlled squelch circuit in the mixer can generate it. The settings are implemented as either a DIP switch or a jumper. A computer controlled solid-state switch may also be used.

Figure 4:
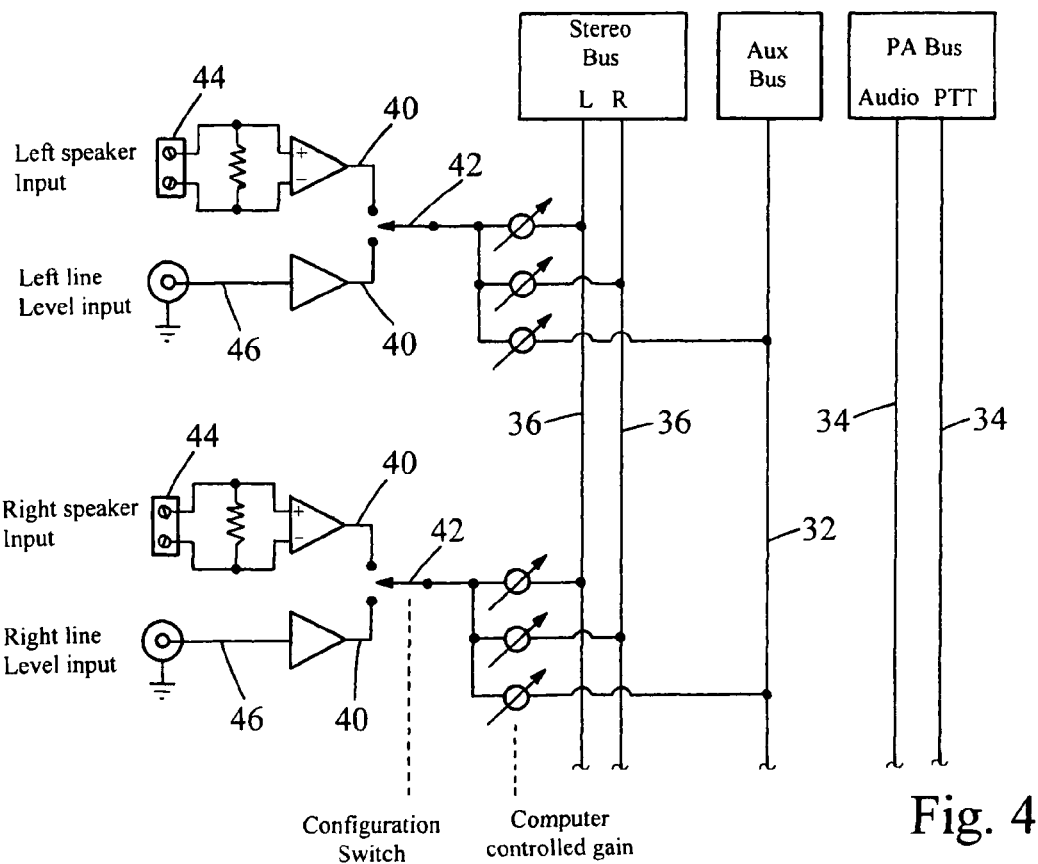
FIG. 4 is a schematic diagram illustrating the connection of the stereo input to the mixer busses, in accordance with the present invention.

With reference to FIG. 4, the connection of the stereo input 40 to the mixer busses 32, 34, 36 is illustrated, in accordance with the present invention. The stereo input 40 can be routed to the stereo 36 and aux 32 busses. The stereo inputs are intended for a vehicle entertainment system (i.e. an AM/FM tuner) which are not required to be routed to the PA bus 24.

The mixer can change the balance of the stereo output, and can mix the right and left channel inputs together on both the right and left channel outputs. This allows both reducing the channel separation and steering the apparent location of the signal.

Each stereo input 40 has a configuration setting 42 to switch between speaker 44 and line level 46 inputs. It is implemented similarly to the settings for a monaural input.

The microphone router occupies three microphone inputs and sends the audio and PTT signals to the VACM (for voice recognition) and up to five radios or other devices. The router routes both audio and PTT signals. The PTT enables the microphone and the appropriate output devices.

The microphone router can send any input to one of the six outputs. Any inputs not being used are disabled. Multiple microphones can be routed to the same output. Routing more than one microphone to the same output causes them to mix (i.e., the audio is mixed and the PTT signals are OR'd together) and both can talk at the same time.

The three microphones are preferably configured as follows:
1. a hands free microphone for the driver;
2. an optional handheld microphone for driver or passenger; and
3. an optional auxiliary microphone (possibly a wireless microphone).

In addition to the switched output, the router provides an unswitched buffered output from each microphone that is sent as an input to the audio mixer.

Figure 5:
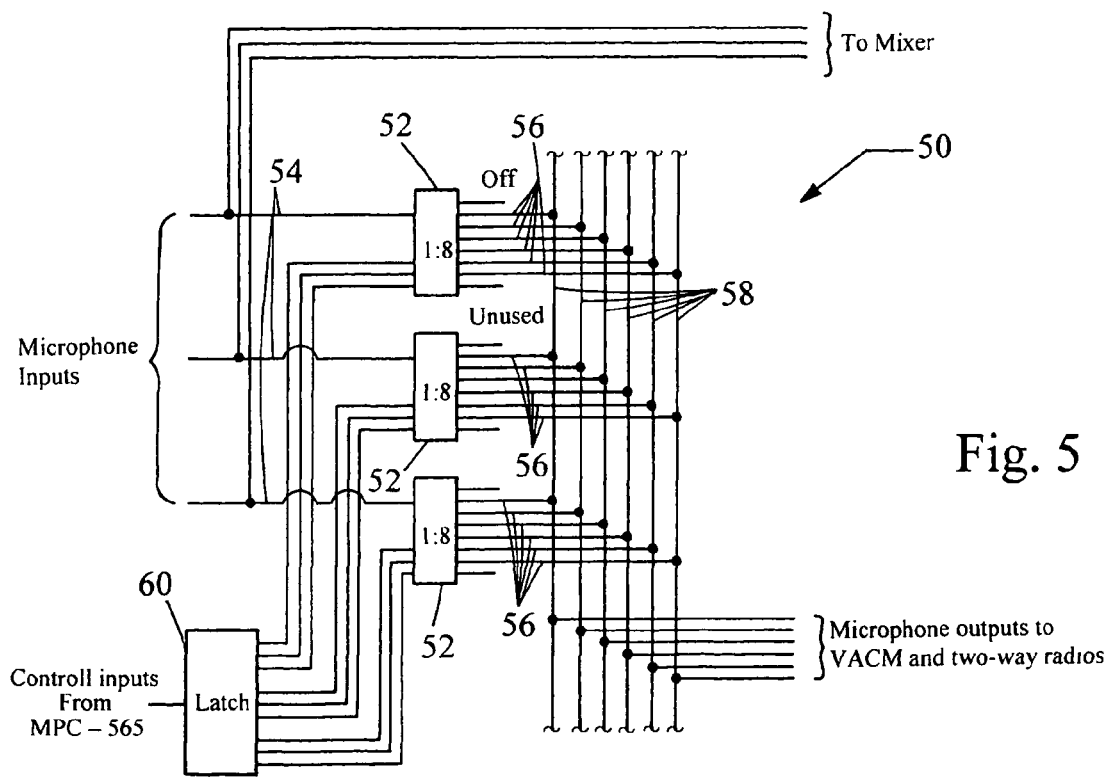
FIG. 5 is a block diagram illustrating the microphone router, in accordance with the present invention.

With reference to FIG. 5, a block diagram of the microphone router 50 is illustrated, in accordance with the present invention. The switch is implemented using 1:8 demultiplexers 52 of which one output is "unused" (as differentiated from "off"). The microphone router includes two main circuits: a microphone input circuit 54, replicated three times and a microphone output circuit 56, replicated six times. A bus 58 connects the circuits. In addition, a latch 60 interfaces to the MPC-565 (not shown) to hold the routing information.

Figure 6:
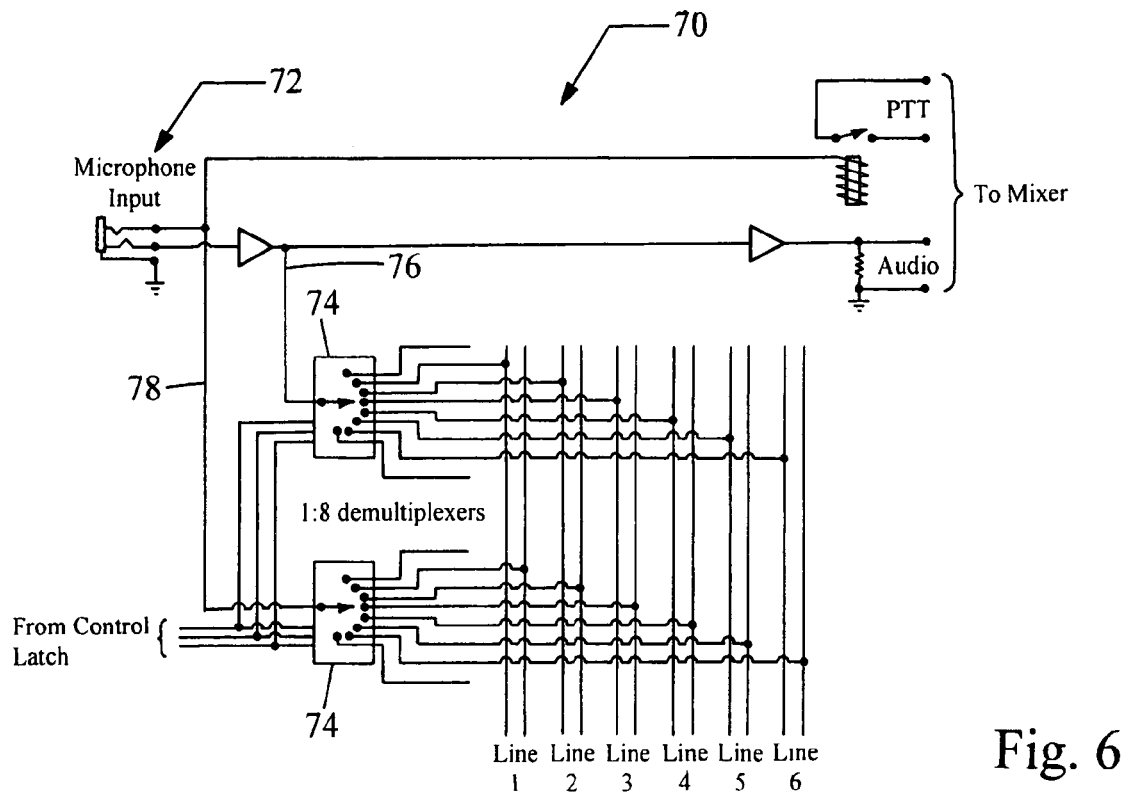
FIG. 6 is a schematic diagram illustrating a microphone input circuit, in accordance with the present invention.

With reference to FIG. 6, a schematic diagram of a microphone input circuit 70 is illustrated, in accordance with the present invention. For purposes of illustration, the drawing shows switches and relays where an alternative embodiment of the router may use solid-state components. The input circuit 70 supports both transistorized microphones and condenser microphones. The microphone selection is made during system configuration, including setting the phantom power to the microphone (0–12 vdc) and setting the gain. Each microphone 72 can be individually configured. Moreover, the present invention contemplates setting the configuration in hardware and/or software. A pair of 1-to-8 demultiplexers 74 switches the microphone 72 to the desired output bus. One demultiplexer 74 routes the audio signal 76 onto the internal bus and the other routes the PTT signal 78 onto the internal bus. The demultiplexers are ganged together so that the audio and PTT inputs from a microphone are routed as a pair.

Figure 7:
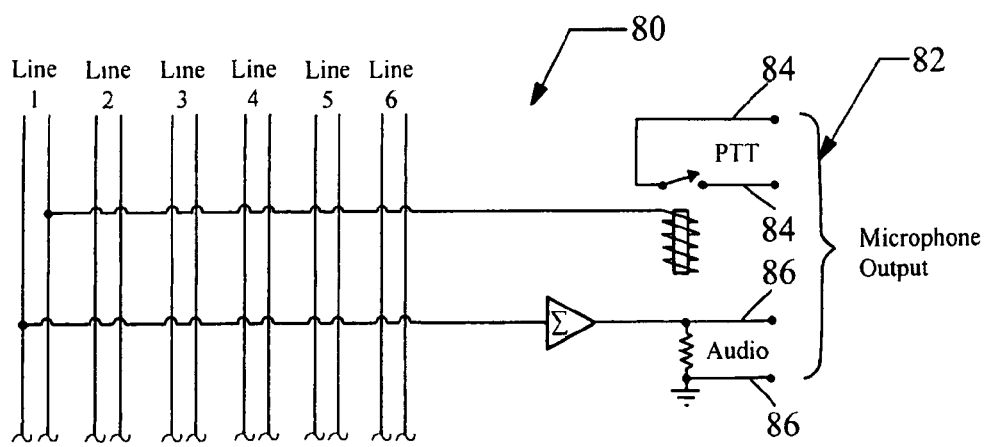
FIG. 7 is a schematic diagram illustrating a microphone router circuit for matching router and output circuits, in accordance with the present invention.

With reference to FIG. 7, a schematic diagram of a microphone router circuit 80 is illustrated for matching router and output circuits, in accordance with the present invention. The circuit 80 connects to the internal bus and provides a microphone level output 82 that can be connected to the VACM or to a two-way radio. The output circuit provides both a PTT signal 84 and a balanced and isolated audio signal 86.

The audio board requires connectors for power/ground, communication with processor, and audio input and output signals.

Figure 8:
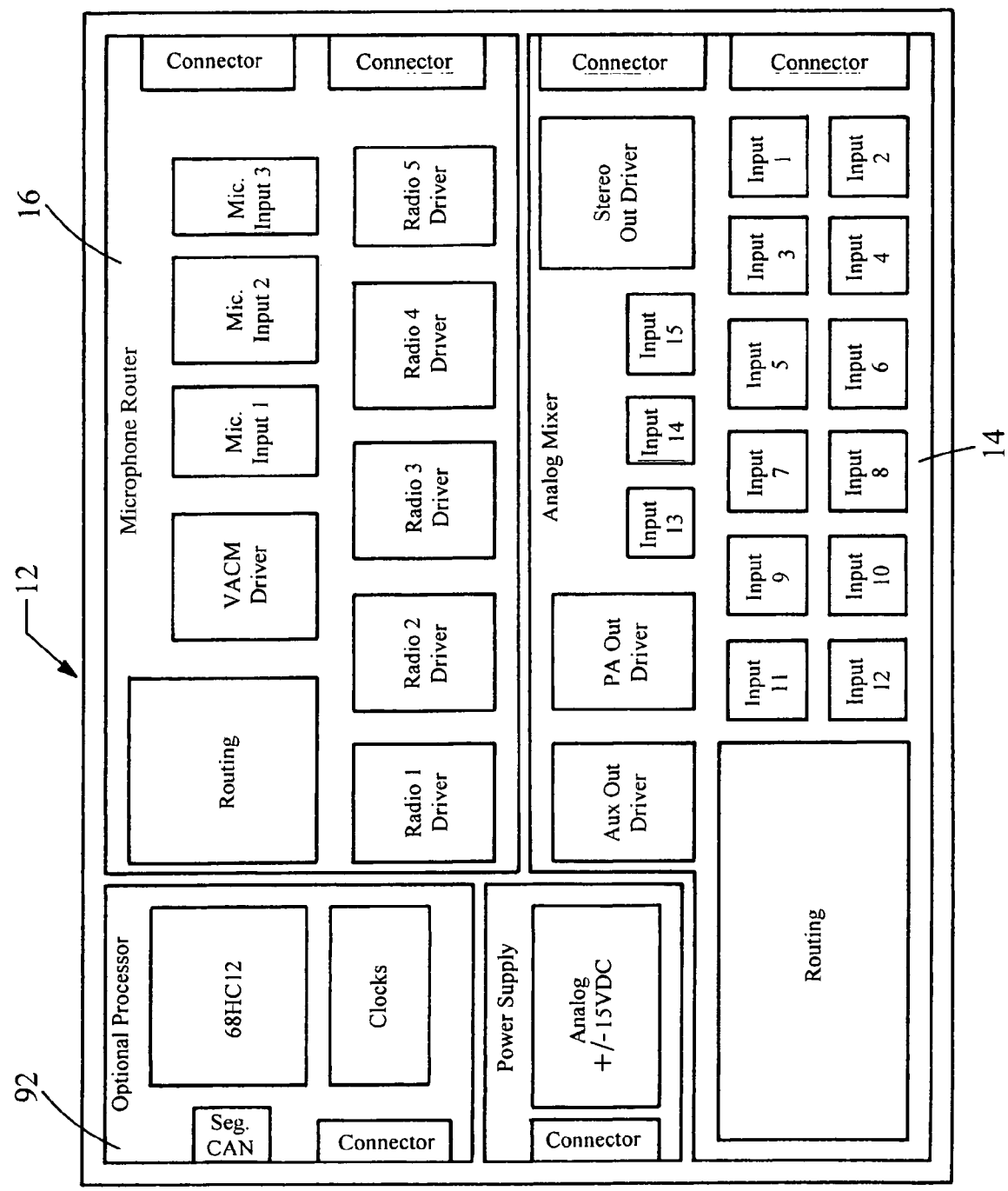
FIG. 8 is a block diagram illustrating an embodiment of the audio board, in accordance with the present invention.

With reference to FIG. 8, a block diagram of an embodiment of the audio board 14 is illustrated, in accordance with the present invention. The audio board 14 includes of four major subsystems. The only subsystem not discussed previously is the optional processor block 92. When board 14 is used as an internal interface module block 92 is depopulated since those functions are incorporated into the main processor board. When board 14 is used as an external interface module, block 92 includes a 68HC12 micro-controller or similar device and CAN interface. Together, they drive a (Serial Peripheral Interface) SPI interface to the audio mixer and microphone router. The interface looks just like the interface that the main processor board drives when the audio board is used as an internal interface module.

Figure 9:
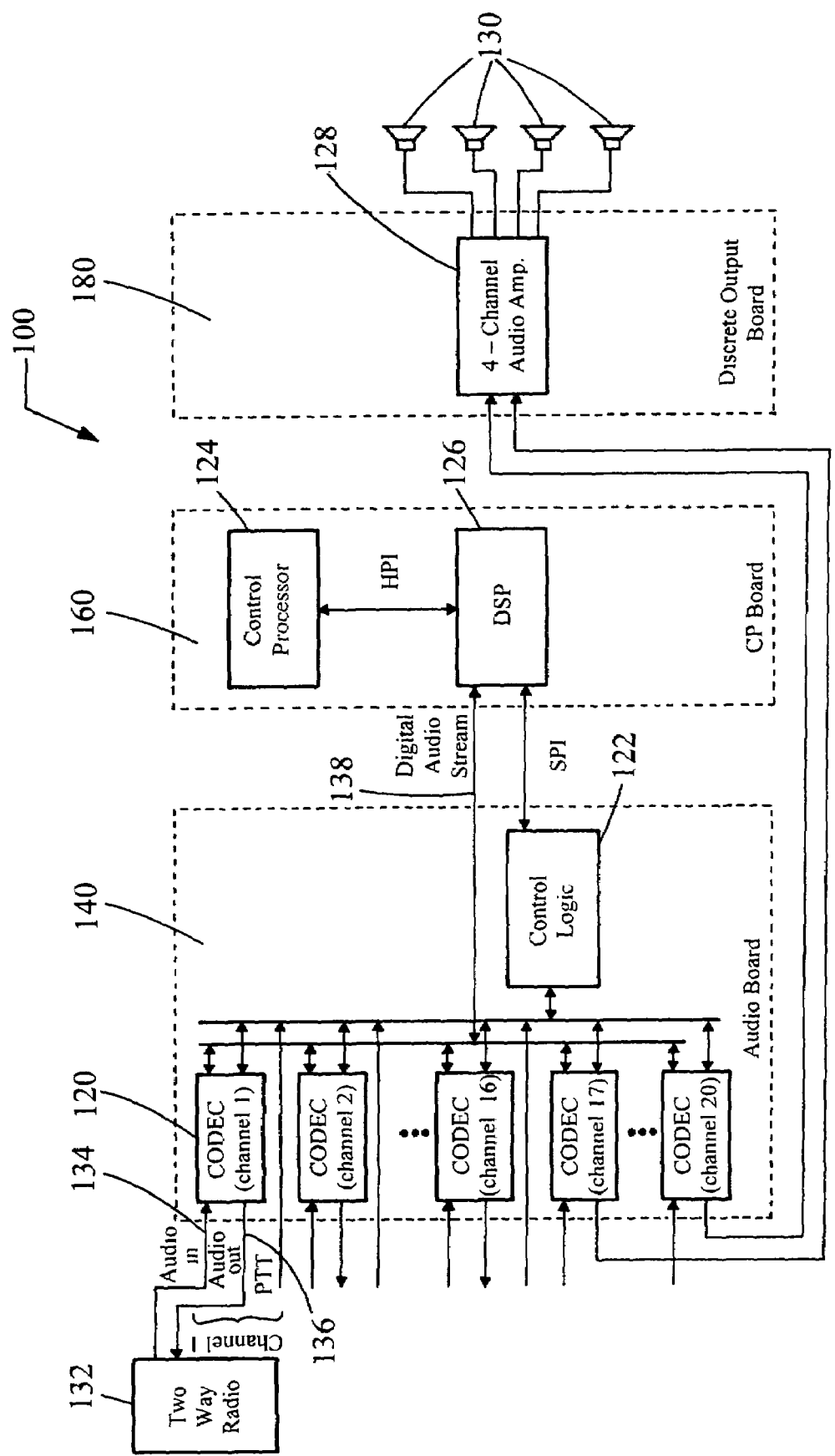
FIG. 9 is an alternate embodiment illustrating an in vehicle audio system for processing a plurality of audio input signals, in accordance with the present invention.

With reference to FIG. 9, an alternate embodiment of an in vehicle audio system 100 for processing a plurality of audio input signals 134 is illustrated, in accordance with the present invention. System 100 includes an audio board 140, a processor board 160, and an audio output board 180. The audio board 140 includes twenty CODECs and supporting circuitry (e.g. control logic 122 and microphone power). Board 140 receives twenty analog inputs and combines the inputs into a 32 kHz by 16 bit digital audio stream that is passed to processor board 160. Further, board 140 receives a 32 kHz by 16 bit digital audio stream from processor board 160 and generates 20 analog outputs. Generally, all the inputs are identical and all the outputs are identical.

Processor board 160 includes a central processor (CP) 124 and a digital signal processor (DSP) 126. The DSP 126 does all the audio processing, including: mixing, routing, and array microphone signal processing. The processing executed by DSP 126 is controlled by configuration settings that CP 124 passes to DSP 126 via a host processor interface (HPI). Further, CP 124 uses the HPI to download firmware to DSP 126 each time the system powers up. Further, CP 124 sends commands to DSP 126 during normal system operation. DSP 126 controls audio board 114 (i.e. input levels, CODEC gain levels, etc.) through a serial peripheral interface (SPI). The SPI is a standard interface supported by many micro-controllers and micro computers, including an MPC565 and 68HC112 micro controllers. Output board 118 includes an audio amplifier 128 in communication with audio board 114 and a plurality of speakers 130. Audio amplifier 128 amplifies the data signals received from audio board 114 and then communicates those signals to the plurality of speakers 130. Speakers 130 then broadcast the signal to a vehicle's passenger compartment. Preferably, system 100 includes at least four speakers 130 and accordingly, audio amplifier 128 is a four-channel audio amplifier. Further, system 100 provides enable inputs and outputs for most of the audio channels. The enable input and output information is passed between DSP 126 and audio board 114 via the SPI. For example, the enable inputs are typically connected to push-to-talk (PTT) signals from microphones or to the squelch outputs for radios. System 100 generates the enable outputs using the enable inputs, internally generated voice operated transmitter (VOX) signals, and input from CP 124 as directed.

DSP 126 implements a seventeen by twenty mixer/router through control logic. Sixteen of the physical inputs are routed to the mixer. The seventeenth mixer input is reserved for a future processed audio input that will be generated from a four array microphone inputs.

Advantageously, there are no inherent restrictions on routing, all inputs to the mixer/router can be routed to any of the outputs, along with the accompanying enable signals. Of course, a high level control software has the option of limiting certain routing combinations but the hardware does not enforce these restrictions.

In addition to routing audio signals to various outputs, the mixer/router routes the enable signals to the appropriate enable outputs to be used for keying radios, enabling voice recognition, activating log recording, etc. The enable signals are also used to modify the internal behavior of the mixer, for example, prioritizing certain inputs, changing the gain of an input, or modifying the audio routing. The mixer routes the enable signals in a similar manner to and with the same flexibility as it routes the audio signals. Any input enable signal can be used anywhere in the mixer.

Devices such as a two-way radio 132 have both inputs 134 and outputs 136 associated with them, however, from an internal routing perspective, the inputs 134 and outputs 136 are treated as separate entities. Although the connector strategy may imply that certain pairs of inputs 134 and outputs 136 belong to the same device, the actual relationship of input 134 to output 136 is totally under the direction of the high level software.

In embodiment of the present invention, multiple inputs are assigned to a signal output. In this case, control software is provided for designating one or more inputs as priority inputs which would result in a dimming (reduction in volume) or completely turning off the other inputs. Further, some devices require a signal at all times. For example, a voice recognition system continuously tracks the ambient noise levels. However, other devices only require noise signal to be present when a corresponding enable signal is active. The mixing/router of the present invention support both functions.

Further, the present invention provides a mixer/router implemented by DSP 126 and designed to support the functions shown below. Processor 124 sets up the following functions when required by changing DSP's low level control information. After the low level control information is set by processor 124, DSP 126 will perform the following functions without processor 124 interaction. By keeping processing 124 out of the loop, the mixer/router of DSP 126 responds more quickly to changes in the audio inputs. Some of the functions supported by DSP's mixer/router are:

a) Routes two-way radio audio to a public address speaker;

b) Create a cross-band mobile repeater to assist communication between hand-held radio and dispatch (for example, by interconnecting 150 mHz radio and a 450 mHz radio to the mixer to function as a mobile repeater);

c) Provide a mobile command post function by using a multiple radios to connect different agencies or sources on different radio bands;

d) Use a single hands-free microphone to work with both a voice recognition and two-way radio by selecting the appropriate PTT switch (i.e. one switch for voice recognition, another for the radio);

e) Log conversations and other communication using the vehicle's recorder system;

f) Set the apparent spatial location of each radio within the vehicle compartment using speakers 130; and g) Use a hands-free microphone operating in VOX mode with the dispatch two-way radio while the vehicle is operating.

Audio inputs 136 are specific as to their function. Microphone input and line and speaker inputs are provided, and because of electrical differences, six different types of input circuits are provided. For example, a general purpose input having an input voltage ranging from 80 mV to 5 volts RMS with a PTT is provided. Input impedance is at least 10 K Ohms. A swamping resister may be placed across a line to function as a speaker load.

General purpose high level inputs work from 400 mV to 25 volts RMS without PTT. Input impedance is at least 10 K Ohms. This input is for exceptionally high level input signals such as a siren driver amplifier.

Speaker inputs work from 160 mV to 10 volts RMS, no PTT. Input impedance is at least 10 K Ohms. Again, a swamping resister may be placed across the line to function as a speaker load. Speaker inputs are designed to handle high output signals that would overpower a general purpose input.

A hand-held microphone input is provided to work with standard transistorized carbon microphone and having a 12 volt bias voltage. The microphone input supports PTT. The microphone's impedance is 600 Ohms. A hand-held microphone is 16 mV to 1 volt with PTT; a wireless microphone is 80 mV to 5 volts with PTT and a hands-free microphone is 80 mV to 5 volts but with no PTT. Input impedance is at least 10 K Ohms. Array element microphone inputs work identical to standard microphone input except that they do not support PTT.

Each input 136 has a gain control that may be set by processor 124. Processor 124 sets the overall input sensitivity range which may be either a positive or negative gain value (using a db scale). The gain is achieved using a programmable gain feature of the CODEC, and analog gain section before the CODEC and the digital gain applied to the DSP. Table 3 below shows an assignment of physical input signals along with the properties of the individual inputs, in accordance with an embodiment of the present invention.

TABLE 3

| Channel | Purpose | Type |
|---|---|---|
| 1 | Radio 1 | GP |
| 2 | Radio 2 | GP |
| 3 | Radio 3 | GP |
| 4 | Radio 4 | GP |
| 5 | Radio 5 | GP |
| 6 | Radar (Doppler signal) | GP |
| 7 | Spare | GP |
| 8 | Spare | GP |
| 9 | AP | GP |
| 10 | Wireless Microphone | GP |
| 11 | Handheld Microphone | Mic. |
| 12 | Handsfree Microphone | GP |
| 13 | VACM Responses | GP |
| 14 | Reserved for siren driver signal for noise cancellation | GPH |
| 15 | AM/FM Tuner Left Channel | Speaker |
| 16 | AM/FM Tuner Right Channel | Speaker |
| 17 | Reserved for array microphone element 1 | Array Mic. Element |
| 18 | Reserved for array microphone element 2 | Array Mic. Element |
| 19 | Reserved for array microphone element 3 | Array Mic. Element |
| 20 | Reserved for array microphone element 4 | Array Mic. Element |

The mixer implemented in DSP 126 has an input 138 which carries the digital information from the CODEC's 120 to DSP 126. Each of the mixer inputs 138 have a gain control that is used to fine tune and normalize the input signal. The mixer normalizes the inputs to minimize distortion and to avoid overdriving a radio transmitter which would cause it to operate incorrectly. Each input 138 is capable of generating an enable signal. The enable signal can be generated using any combination of the following inputs:

1) An external enable input, usually generated by the attached device using a "dry contact" such as a microphone push-to-talk switch or a radio generated squelch open signal;

2) An internal voice operated transmitter (VOX) signal generated by DSP 126 to indicate the presence of audio on the input channel; or 3) A processor enable is generated by software running on processor 24.

Each mixer input 138 is configured to use any or none of the enable signals. If multiple enable signals are selected, then they are logically or'ed together (any one of the enable signals will activate the enable output).

With the exception of the four speaker outputs, all audio outputs have an associated output enable signal which is in the form of a dry contact. The outputs specified for the two-way radios each have a hardware timer on the PTT output that times out after four minutes. The monaural outputs are settable from microphone output levels up through a 600 Ω 0 dB ceiling at line level. DC blocking is required on all monaural outputs. Table 4 below shows an assignment of the output signals, in an embodiment of the present invention.

TABLE 4

| Signal | Purpose | Type |
|---|---|---|
| 1 | Two-way radio 1 | Monaural with PTT + HW timer |
| 2 | Two-way radio 2 | Monaural with PTT + HW Timer |
| 3 | Two-way radio 3 | Monaural with PTT + HW Timer |
| 4 | Two-way radio 4 | Monaural with PTT + HW Timer |
| 5 | Two-way radio 5 | Monaural with PTT + HW Timer |
| 6 | Spare | Monaural with PTT |
| 7 | Spare | Monaural with PTT |
| 8 | VCR | Monaural with PTT |
| 9 | Spare | Monaural with PTT |
| 10 | Spare | Routed to internal expansion connector |
| 11 | Spare | Routed to internal expansion connector |
| 12 | Spare | Routed to internal expansion connector |
| 13 | VACM | Monaural with PTT |
| 14 | PA system (siren amplifier) | Monaural with PTT |
| 15 | Spare | Routed to internal expansion connector |
| 16 | Spare | Routed to internal expansion connector |
| 17 | Stereo Left Front | To internal Amplifier |
| 18 | Stereo Right Front | To internal Amplifier |
| 19 | Stereo Left Rear | To internal Amplifier |
| 20 | Stereo Right Rear | To internal Amplifier |

Figure 10:
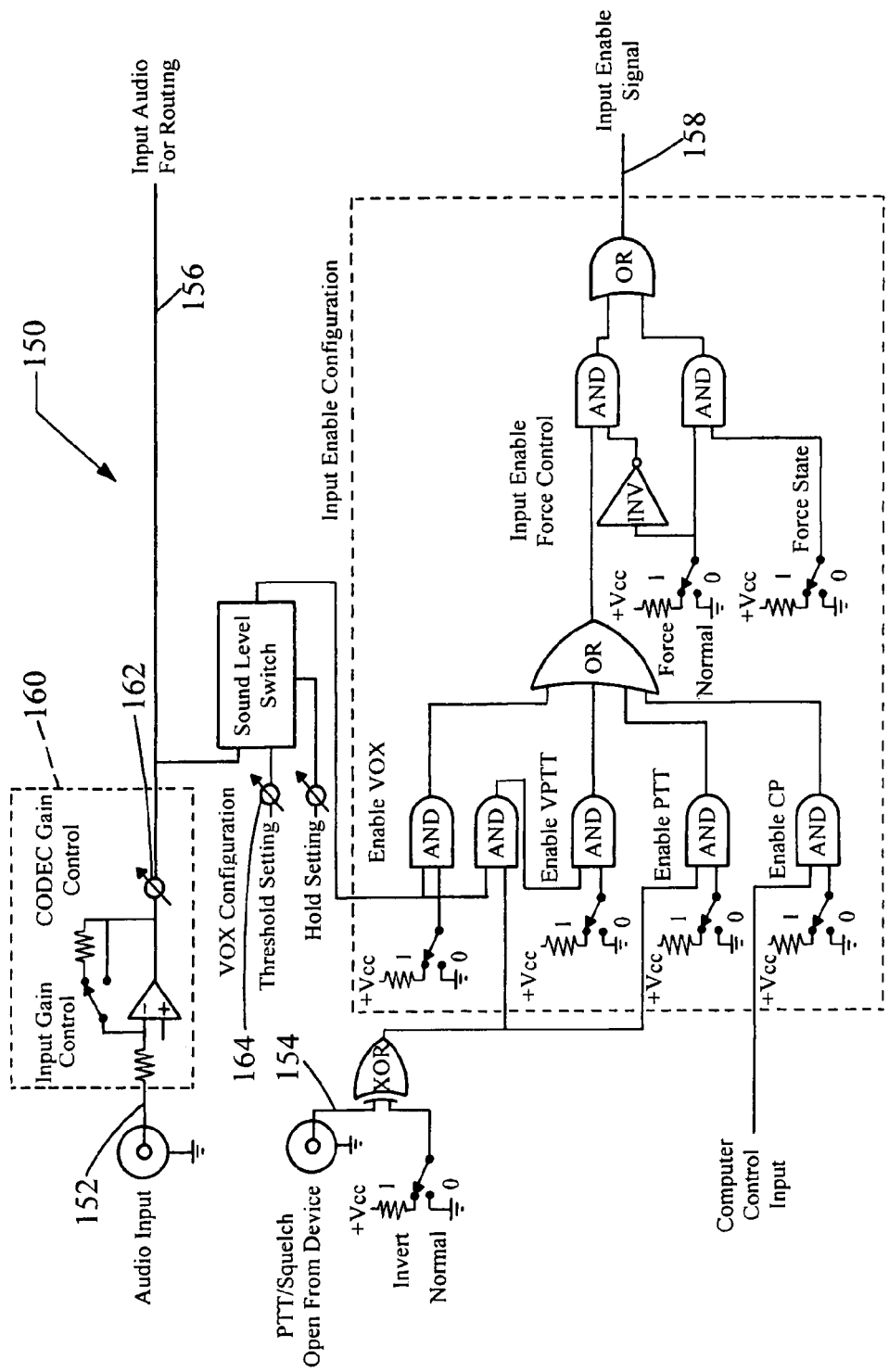
FIG. 10 is a block diagram illustrating a general purpose input channel, in accordance with the present invention.

Referring now to FIG. 10, a general purpose input channel 150 is illustrated, in accordance with the present invention. Input channel 150 includes an audio input (analog) 152 and an enable input (discrete) 154. Two outputs, audio and enable are generated and used internally within the mixer/router of DSP 126. Both outputs 156 and 158 are digital. Audio input signal 152 may be either line level or speaker level. Further, the audio input signal 152 is processed by a gain control stage 160 in CODEC 20 which is reflected in the digitized output 156. Enable input 154 may come from for example a microphone pushed-to-talk switch or a squelch open indication from a two-way radio. Further, an input enable signal may be generated by the input channel and configured to come from any combination of: an external device, an internally generated VOX signal, a combination of a VOX signal and an external device, or directly driven by processor 124.

All the switches shown in FIG. 10 are, in an embodiment, registers in DSP 126 or latches on audio board 114. Processor 124 sets the DSP registers directly via the HPI interface. Processor 124 sets the latches on audio board 114 by setting registers in DSP 126. DSP 126 then propagates the audio board 114 via the SPI interface. Gain and level settings 162 and 164 (i.e. the CODEC gain setting or VOX threshold setting) are also registers. Processor 124 controls gain and level settings 162 and 164 in a like manner as switches.

Mixer of DSP 126 provides 20 outputs. Any input 138 can be routed to any output. Multiple inputs may be assigned to a single output in which case they will be mixed accordingly to their gain settings. System 100 automatically calculates gain settings so that multiple inputs do not override an output. System 100 further provides an automatic compression system so that the output level can be set to be heard when only one channel is active and not be driven into distortion when the remaining inputs go active at the same time. Using the enable signals one or more inputs may be assigned a priority allowing an input to take over a channel when the enable signal becomes active. For example, each output can be assigned its own set of priority inputs. The priority inputs may enable the other inputs on an input by input basis. Generally, no more than one input will be designated a priority input for each output channel. For example, the input enable signal may be used internally to disable the output even when the input audio is not enabled for that output.

Each output has for example, all seventeen enable signals available with the ability to ignore or mask out enable signals that are not related to the output. Additionally, each output has a processor 124 controlled enable signal. The processor controlled enable signal has a higher priority than the other enable signals, such that when the processor enable signal is commanding the output on, the output is on regardless of the other enable signal. Each output enable has the configurable setting that permits it to be in one of the following states: always on, always off, follow the input enable signals, and follow only the processor enable signal. The enable signal for example, may be sent to an output device to activate a transmitter, start a log in device, or enable voice recognition.

In an embodiment of the present invention microphone inputs are provided. The microphone inputs are general-purpose inputs with different initial gain settings. In addition, a handheld microphone input (a specially designated channel) supports a powered microphone with a +12V power signal imposed on the microphone audio input signal. The handheld microphone input supports both standard dynamic microphones and standard "transistorized" amplified microphones that mimic carbon microphones. The hands free microphone input is also specialized in that it supplies a DC voltage of at least 9.0V at a current of at least 100 mA for powering the external hands free microphone electronics.

Of the twenty physical inputs, sixteen are directly connected to the mixer. The remaining four inputs, the array microphone elements, are made available for future array microphone processing. The $17^{th}$ input of the mixer is reserved for the output of the array microphone algorithm. The mixer/router mixes and routes both audio signals and enable signals (PTT output).

Advantageously, the audio portion of the mixer/router can mix any combination of the input audio channels into each output channel. Processor 24 is responsible for communicating to DSP 126 what level of each input signal should be mixed into each output signal. If the mix level is set to zero, the corresponding input channel is not included in the output signal.

Processor 124 is capable of specifying two sets of mixing levels for each output channel. The two levels can be used in various ways. For example, the speaker output channels can be set up with one setting for normal listening and a second setting that dims the AM/FM tuner, etc. when the user presses the push to talk switch for a microphone.

Figure 11:
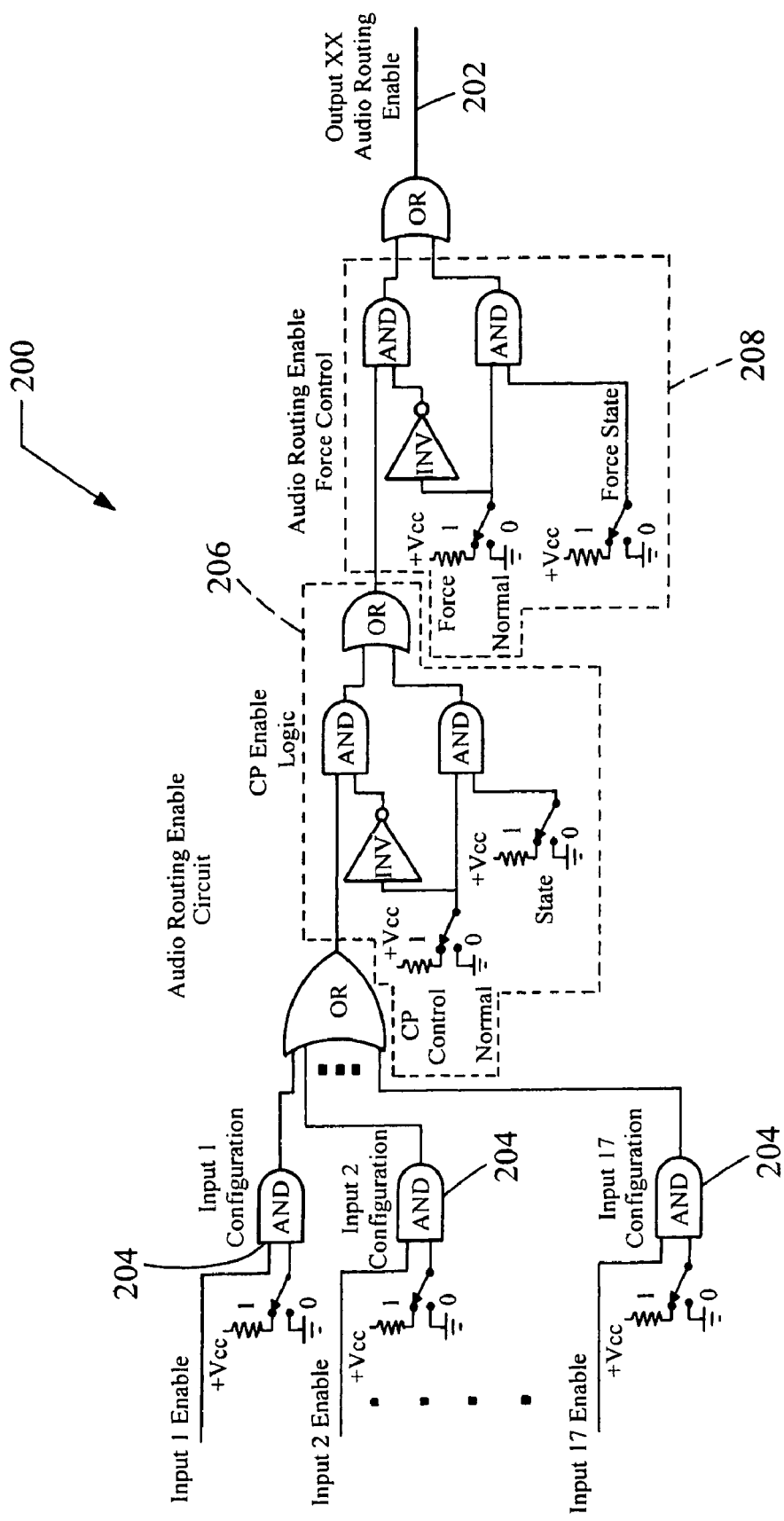
FIG. 11 is a block diagram illustrating an audio routing logic for an output channel, in accordance with the present invention.
Figure 12:
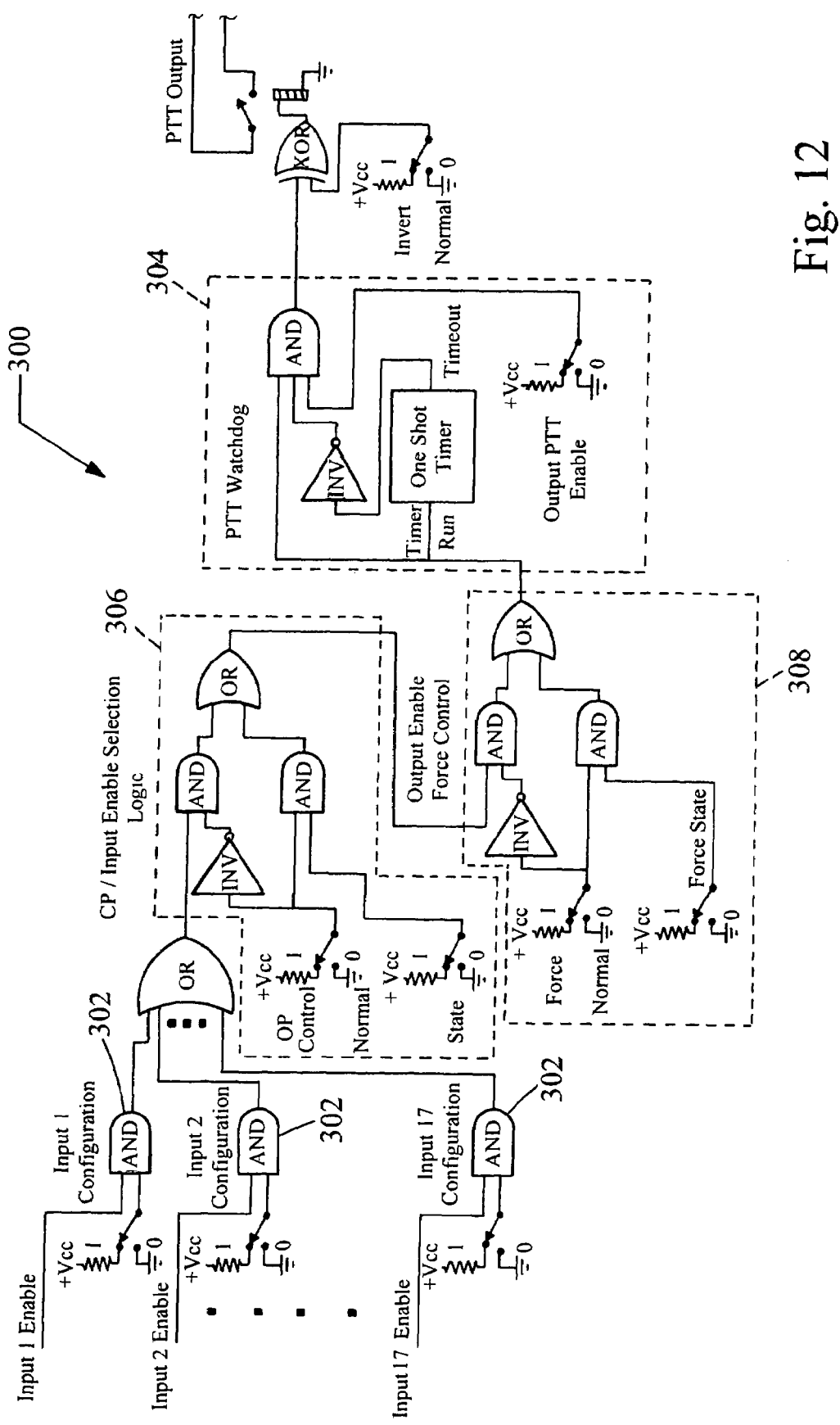
FIG. 12 is a block diagram illustrating how the PTT signal for each output is generated, in accordance with the present invention.

With reference to FIG. 11, there is illustrated an audio routing logic 200 for an output channel. The audio routing logic determines which of two sets of mixer levels to use at any moment in time. Each output channel has its own copy of this logic with the associated configuration switches. Output 202 of circuit 200 determines which of the two sets of mixer levels will be used to generate an audio output.

The input configuration switches 204 determine which inputs are used to calculate the Audio Routing Enable signal for a given output channel. CP Enable logic 206 determines whether the CP 124 controls the output, overriding the enable calculation. Force control logic 208 allows a second level of override, which is used primarily for debugging purposes.

With reference to FIG. 112, a PTT Enable Signal Logic 300 is illustrated. PTT signal for each output is generated. Each output has its own copy of logic 300 along with the associated configuration switches 302 and controls.

PTT Enable Signal Logic 300 is similar to its audio counterpart, with the addition of a watchdog timer 304 and the ability to completely disable the output.

Input configuration switches 302 (implemented as a register in DSP 126) selects which inputs are part of the calculation that generates the enable signal output. The next logic section 306 selects whether the CP or the Input Enables controls the PTT logic. It is followed by force logic 308 to hold the PTT on or off always. Then the PTT watchdog timer 304, mandated by the FCC, makes it impossible to hold a radio in key on condition for more than three minutes. The watchdog timer section 304 is only present on outputs that act as microphone inputs to two-way radios. Then the PTT output can optionally be disabled or inverted.

The PTT watchdog timer may need to be implemented in hardware as a separate device if FCC requirements dictate hardware-based fail-safe devices.

The mixer/router supports two kinds of outputs: monaural and speaker. The monaural outputs drive two-way radios, logging devices, etc. The speaker outputs drive the four speakers in the vehicle passenger compartment.

Figure 13:
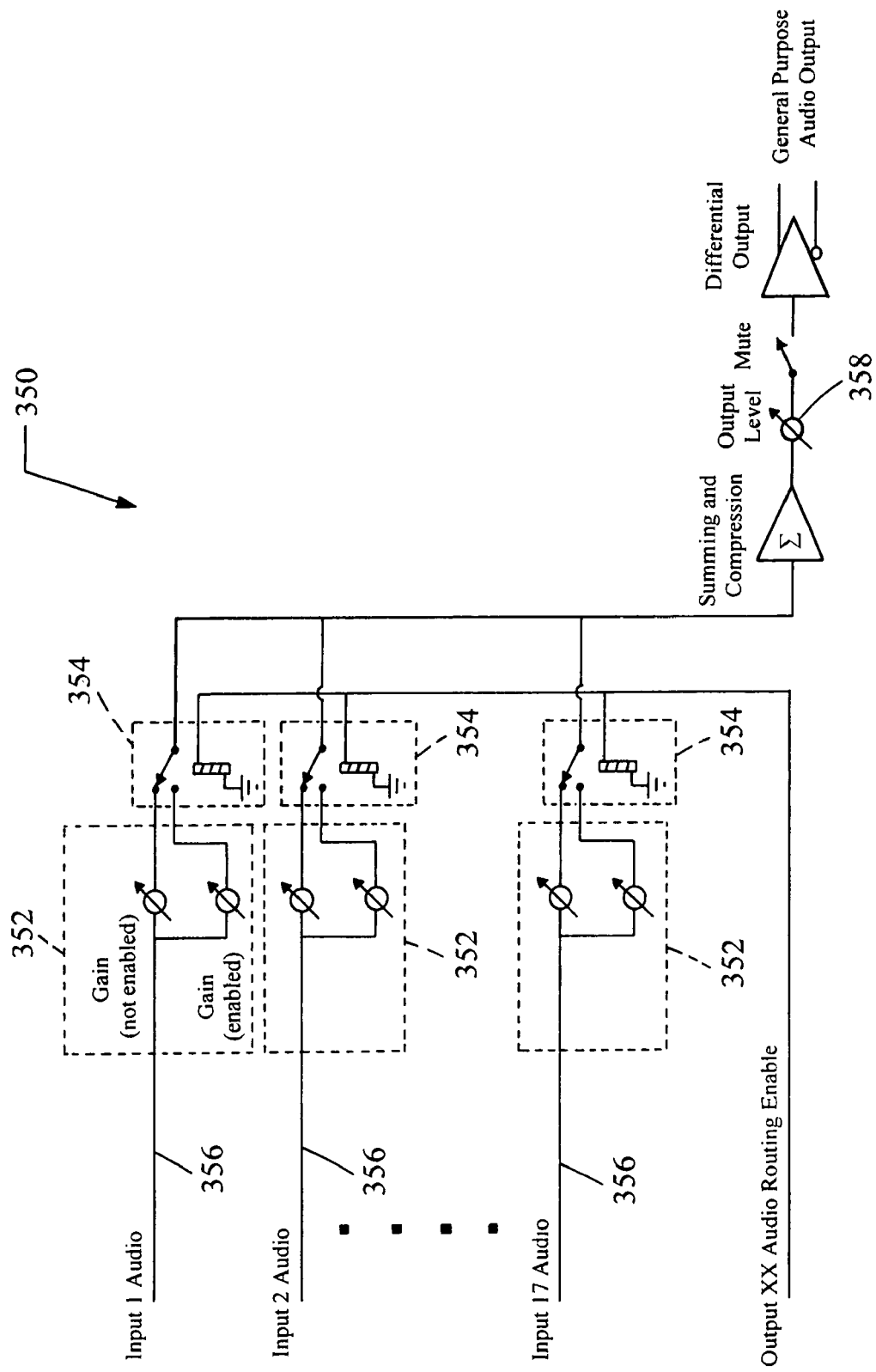
FIG. 13 is a block diagram illustrating an audio routing for a single output channel, in accordance with the present invention.

With reference to FIG. 13, an audio routing 350 for a single output channel is illustrated. Each output has its own Audio Routing Enable Signal Logic (see FIG. 11). Seventeen pairs of gains 352, an enabled and a disabled setting 354 for each input 356

Each output has an automatic gain control circuit (AGC) 358 that limits the level passed on to the external device. The primary function of the AGC circuit 358 is to allow the system to have multiple outputs active at the same time and to maintain the average audio output level, regardless of how many outputs are producing audio at a given time. Although the AGC does, in fact, compress the audio signal, it is not intended to be used as a full-fledged compressor because that would require running the normalized signals "hot", which in turn will cause the mixer to distort the output.

The final step in the output processing is to be able to set the output level. Speaker outputs have the same audio processing capability as monaural outputs (see FIG. 13), but they serve a particular purpose. By including four speaker outputs it is possible to assign both the level of an input channel in the vehicle, and where in the passenger compartment the signal appears to originate. The ability to assign input signals to different spatial locations eases the listeners' auditory burden when multiple audio sources are present simultaneously.

As any person skilled in the art of systems and methods for routing audio signals in automobiles will recognize from the previous detailed description and from the figures and claims, modifications and changes can be made to the preferred embodiments of the invention without departing from the scope of this invention defined in the following claims.

The invention claimed is:

1. An audio signal processing system for a vehicle, the system comprising: at least two radios operating on at least two non-interfering radio frequencies to produce at least two radio audio output signals and at least two radio squelch control signals; at least one microphone for receiving spoken audio and for producing a radio transmit control signal and a microphone audio output signal; an audio router having a plurality of audio router output ports and a plurality of audio router input ports, wherein the audio router input ports are connected to the at least one microphone and the at least two radios for receiving the at least two radio audio output signals, the microphone audio output signal and the at least two radio squelch control signals; a processor in communication with the audio router for monitoring the at least two radio squelch control signals and the radio transmit control signal to determine which of the at least two radio audio output signals and the microphone audio output signal received by the audio router to route to the plurality of audio router output ports and to determine which of the at least two radio squelch control signals and the radio transmit control signal the router should activate to one of the radios, in order to transmit the audio output signal that corresponds to the activated control signal; an audio mixer connected to the plurality of audio router output ports for receiving and combining the at least two radio audio output signals, wherein the audio mixer spatially separates the at least two radio audio output signals and controls the volume of the at least two radio audio output signals; and at least two speakers for broadcasting the at least two spatially separated radio audio output signals to a vehicle occupant.

2. The system of claim 1 wherein the audio router further comprises a plurality of analog to digital converters.

3. The system of claim 1 wherein the audio router further comprises a plurality of CODECS.

4. The system of claim 3 wherein the audio router comprises twenty CODECS.

5. The system of claim 1 wherein the processor further comprises a digital signal processor.

6. The system of claim 1 wherein the at least two speakers further comprises four speakers.

7. The system of claim 1 further comprising at least one microphone.

8. The system of claim 1 wherein the audio mixer further comprises an audio amplifier.

9. The system of claim 1 wherein me audio router further comprises a microphone router circuit for directing a plurality of microphone inputs to a plurality of audio equipment.

10. A method for processing a plurality of audio signals having different non-interfering frequencies, the method comprising: producing at least two radio audio output signals and at least two radio squelch control signals with at least two radios operating on the at least two non-interfering radio frequencies; receiving spoken audio with at least one microphone to produce a radio transmit control signal and a microphone audio output signal; receiving the at least two radio audio output signals, the microphone audio output signal and the at least two radio squelch control signals using an audio router having a plurality of audio router output ports and a plurality of audio router input ports, wherein the audio router input ports are connected to the at least one microphone and the at least two radios; a processor in communication with the audio router for monitoring the at least two radio squelch control signals and the radio transmit control signal to determine which of the at least two radio audio output signals and the microphone audio output signal received by the audio router to route to the plurality of audio router output ports and to determine which of the at least two radio squelch control signals and the radio transmit control signal the router should activate to one of the radios, in order to transmit the audio output signal that corresponds to the activated control signal; receiving and combining the at least two radio audio output signals using an audio mixer connected to the plurality of audio router output ports, wherein the audio mixer spatially separates the at least two radio audio output signals and controls the volume of the at least two radio audio output signals; and broadcasting the at least two spatially separated radio audio output signals to a vehicle occupant using the at least two speakers.

* * * * *